United States Patent [19]

George et al.

[11] Patent Number: 4,874,801
[45] Date of Patent: Oct. 17, 1989

[54] POLYMER BLEND

[75] Inventors: Eric R. George, Houston; Richard L. Danforth, Missouri City; Paul S. Byrd, Houston, all of Tex.

[73] Assignee: Shell Oil Company, Houston, Tex.

[21] Appl. No.: 135,428

[22] Filed: Dec. 21, 1987

[51] Int. Cl.⁴ .......................... C08K 7/14; C08K 9/06; C08K 5/08; C08K 101/06
[52] U.S. Cl. .................................. 523/214; 523/209; 523/217; 524/502
[58] Field of Search ............... 525/185, 221; 524/502, 524/523; 523/209, 214, 217

[56] References Cited

U.S. PATENT DOCUMENTS

| | | | |
|---|---|---|---|
| 2,495,286 | 1/1950 | Brubaker | 260/63 |
| 3,520,861 | 7/1970 | Thompson | 260/88.1 |
| 3,694,412 | 9/1972 | Nozaki | 260/63 |
| 3,780,140 | 12/1973 | Hammer | 525/185 |
| 4,123,585 | 10/1978 | Sparzak et al. | 525/185 |
| 4,275,184 | 6/1981 | Itoh | 525/185 |
| 4,351,931 | 9/1982 | Armitage | 526/227 |
| 4,430,468 | 2/1984 | Schumacher | 524/451 |
| 4,489,193 | 2/1984 | Goswani | 525/185 |
| 4,600,614 | 7/1986 | Lancaster et al. | 428/35 |
| 4,601,948 | 7/1986 | Lancaster et al. | 428/349 |
| 4,650,818 | 5/1987 | Oka et al. | 524/422 |
| 4,678,713 | 7/1987 | Lancaster et al. | 428/421 |

FOREIGN PATENT DOCUMENTS

| | | |
|---|---|---|
| 0121965 | 10/1984 | European Pat. Off. . |
| 0181014 | 6/1986 | European Pat. Off. . |
| 229408 | 7/1987 | European Pat. Off. . |
| 1081304 | 8/1967 | United Kingdom . |

*Primary Examiner*—Allan M. Lieberman
*Attorney, Agent, or Firm*—Dean F. Vance

[57] ABSTRACT

Polymer blends of improved properties are produced from (1) linear alternating polymer of carbon monoxide and at least one ethylenically unsaturated hydrocarbon, (2) copolymers of ethylene and $\alpha,\beta$-ethylenically unsaturated carboxylic acid and (3) glass fibers.

14 Claims, No Drawings

POLYMER BLEND

FIELD OF THE INVENTION

This invention relates to reinforced blends of linear alternating polymers of carbon monoxide and at least one ethylenically unsubstituted hydrocarbon. More particularly, the invention relates to blends of such polymers with certain ethylene-unsaturated carboxylic acid copolymers reinforced with glass fibers. The invention also relates to shaped articles produced from such reinforced polymer blends.

BACKGROUND OF THE INVENTION

The class of polymers of carbon monoxide and olefin(s) has been known for a number of years. Brubaker, 2,495,286, produced such polymers in the presence of free radical catalysts, e.g., peroxy compounds. U.K. No. 1,081,304 produced similar polymers of higher carbon monoxide content in the presence of alkylphosphine complexes of palladium salts as catalyst. Nozaki extended this process through the use of arylphosphine complexes of palladium salts and certain inert solvents, e.g., U.S. Pat. No. 3,694,412.

More recently, the class of linear alternating polymers of carbon monoxide and at least one ethylenically unsaturated hydrocarbon, e.g., ethylene or ethylene and propylene, has become of greater interest in part because of the availability of such polymers. The polymers, often referred to as polyketones or polyketone polymers, have been shown to be of the formula —CO—(A)— wherein A is the moiety of the unsaturated hydrocarbon polymerized through the ethylenic unsaturation. For example, when the ethylenically unsaturated hydrocarbon is ethylene the polymer is represented by the formula —CO—(CH$_2$—CH$_2$)—. The general process for the production of such polymers is illustrated by a number of published European Patent Applications including 0,121,965 and 0.181,014. The process generally involves a catalyst composition formed from a compound of the Group VIII metals palladium, cobalt or nickel, the anion of a non-hydrohalogenic acid having a pKa below 2 and a bidentate ligand of phosphorus, arsenic or antimony.

The resulting polyketone polymers are relatively high molecular weight thermoplastic having utility in the production of shaped articles for containers for food and drink and parts for the automotive industry.

For particular applications, it has been found to be desirable to have properties which are somewhat different from those of the polyketone polymer alone. Although the polyketones have many desirable properties, there are applications where increase in strength would be of advantage.

SUMMARY OF THE INVENTION

This invention contemplates improved reinforced blends of (1) a linear alternating polymer of carbon monoxide and at least one ethylenically unsaturated hydrocarbon and, (2) certain copolymers of ethylene and an α,β-ethylenically unsaturated carboxylic acid, reinforced by the presence of glass fibers. Moreover, the invention contemplates shaped articles produced from such reinforced blends.

DESCRIPTION OF THE INVENTION

The polyketone polymers which are employed as the major component of the reinforced blends of the invention are the linear alternating polymers of carbon monoxide and at least one ethylenically unsaturated hydrocarbon. Suitable ethylenically unsaturated hydrocarbons for use as precursors of the polyketone polymers have from 2 to 20 carbon atoms inclusive, preferably up to 10 carbon atoms, and are aliphatic such as ethylene and other α-olefins including propylene, 1-butene, 1-octene and 1-dodecene, or are arylaliphatic containing an aryl substituent or an otherwise aliphatic molecule, particularly an aryl substituent on a carbon atom of the ethylenic unsaturation. Illustrative of this latter class are styrene, p-methylstyrene, p-ethylstyrene and m-methylstyrene. Preferred polyketone polymers are copolymers of carbon monoxide and ethylene or terpolymers of carbon monoxide, ethylene and a second hydrocarbon of a least 3 carbon atoms, particularly an α-olefin such as propylene.

The structure of the polyketone polymers is that of a linear alternating polymer of carbon monoxide and unsaturated hydrocarbon and the polymer will contain substantially one molecule of carbon monoxide for each molecule of hydrocarbon. When terpolymers of carbon monoxide, ethylene and a second hydrocarbon are employed, there will be at least 2 units incorporating a moiety of ethylene for each moiety incorporating the second hydrocarbon. Preferably, there are from about 10 to about 100 units incorporating a moiety of ethylene for each unit incorporating the second hydrocarbon. The polymer chain is therefore represented by the formula

where B is the moiety of the second ethylenically unsaturated hydrocarbon polymerized through the ethylenic unsaturation. The —CO—(CH$_2$—CH$_2$)— units and the —CO—(B)— units are found randomly through out the polymer chain and the ratio of y:x is no more than about 0.5. In the modification of the invention which employs copolymers of carbon monoxide and ethylene without the presence of a second hydrocarbon, the polymers are represented by the above formula wherein Y=0. When y is other than 0, i.e., terpolymers are employed, ratios of y:x from about 0.01 to about 0.1 are preferred. The end groups or "caps" of the polymer chain will depend on what materials are present during the production of the polymer and whether and how the polymer was purified. The precise nature of the end groups is of little significance with regard to the overall properties of the polymer so that the polymer is fairly represented by the polymer chain as depicted above.

Of particular interest are the polyketone polymers of molecular weight from about 1,000 to about 200,000, particularly those of molecular weight from about 10,000 to about 50,000 containing substantially equimolar quantities of carbon monoxide and unsaturated hydrocarbon. The physical properties of the polymer will depend in part on the molecular weight of the polymer, whether the polymer is a copolymer or a terpolymer and the relative proportion of the second hydrocarbon present in the case of terpolymers. Typical melting points of the polymers are from about 175° C. to about 300° C., preferably from about 210° C. to about 270° C.

A method of producing polyketone polymers which is now becoming conventional is to contact the carbon monoxide and unsaturated hydrocarbon in the presence of a catalyst formed from a palladium compound, preferably a palladium carboxylate such as palladium acetate, the anion of a non-hydrohalogenic acid having a pKa below about 6, e.g., the anion of trifluoroacetic acid or p-toluenesulfonic acid, and a bidentate phosphorus ligand of defined structure such as 1,3-bis(diphenylphosphino)propane or 1,3-bis[di(2-methoxyphenyl)-phosphino]propane. Such a process for polyketone production is illustrated by copending U.S. Patent Application Serial No. 935,431 filed Nov. 14, 1986, now U.S. Pat. No. 4,786,714.

Polymerization is conducted under polymerization conditions in the gaseous phase or in the liquid phase in the presence of an inert diluent such as lower alkanol, e.g., methanol or ethanol. Suitable reaction temperatures are from about 20° C. to about 150° C. with preferred temperatures being from about 50° C. to about 125° C. The reaction pressure will typically be from about 1 bar to about 200 bar, preferably from about 10 bar to about 100 bar. Contacting of the reactants and catalyst is brought about by conventional methods such as shaking or stirring. Subsequent to reaction the polyketone product is recovered as by filtration or decantation. The polyketone product will on occasion contain residues of the catalyst which are removed if desired by treatment with a solvent which is selective for the residues.

The ethylene copolymers which are a second component of the reinforced blends of the invention are copolymers of ethylene and $\alpha,\beta$-ethylenically unsaturated carboxylic acids. Although a variety of $\alpha,\beta$-ethylenically unsaturated carboxylic acids of up to 10 carbon atoms are useful as components of the ethylene-unsaturated acid copolymers, e.g., 2-hexenoic acid, 2-octenoic acid and 2-decenoic acid, the preferred unsaturated carboxylic acids are those of up to 4 carbon atoms inclusive which are acrylic acid, methacrylic acid and crotonic acid. Acrylic acid is a particularly preferred component of the ethylene-unsaturated acid copolymer.

The ethylene-unsaturated acid copolymers comprise a major proportion of ethylene and a minor proportion of the $\alpha,\beta$-unsaturated carboxylic acid. Typical ethylene-unsaturated acid copolymers are from about 0.1% by weight to about 35% by weight, based on total copolymer, of the unsaturated acid but preferably are from about 1% by weight to about 20% by weight of the unsaturated acid on the same basis.

The method by which the ethylene-unsaturated acid copolymer is produced is not critical and such copolymers produced by a variety of methods are suitable as components of the blends of the invention. A number of copolymers of ethylene and acrylic acid or methacrylic acid are commercially available and are useful in the blends of the invention. A general discussion of ethylene-unsaturated acid production is found in Thompson et al, U.S. Pat. No. 3,520,861 and Armitage, U.S. Pat. No. 4,351,931 which are incorporated herein by reference. A particularly suitable type of ethylene-unsaturated acid copolymer is marketed under the tradename of PRIMACOR by Dow Chemical Company.

The precise quantity of the ethylene-unsaturated acid copolymer to be employed in the reinforced blends of the invention is not critical and quantities from about 1% by weight to about 15% by weight, based on total reinforced blend, of the ethylene-unsaturated acid copolymer are satisfactory. Preferred quantities of the copolymer are from about 1% by weight to about 10% by weight on the same basis.

The blends of the invention are reinforced by the presence of glass fiber. The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the glass fiber of the invention is produced is the more common alkali metal silicate glass, particularly sodium silicate glass. Fibers produced of such glass are conventional and are commercially available from a number of U.S. and foreign glass companies. The fibers are useful as reinforcements for polymeric products and are commercially used as such. However, the physical dimensions of the glass fibers are of some importance to successful utilization in a particular application as are the presence or absence of a sizing material or a coupling agent for the glass and the nature of the sizing or coupling agent.

In the polyketone polymer/ethylene-unsaturated acid copolymer/glass fiber blends of the invention, the glass fibers which contribute the most desirable properties to the reinforced blend are chopped glass fibers of circular cross-section. The fibers range in diameter from about $2\times10^{-4}$ inch to about $8\times10^{-4}$ inch, preferably from about $4\times10^{-4}$ inch to about $7\times10^{-4}$ inch. Fibers of greater or lesser diameter are satisfactory but fibers of too small a diameter do not provide the desired strength and fibers of too large a diameter contribute too much weight for the resulting strength and may not be economical. Although in some applications long continuous fibers of glass are satisfactory, it is preferred in the reinforced blends of the invention to use short fibers of glass. Lengths of glass fiber from about 0.10 inch to about 0.5 inch are suitable. While somewhat longer or somewhat shorter lengths are also useful, too long a glass fiber detracts from the processability of the blend-glass mixture while too short a fiber does not provide the desired strength to the blend. It is recognized that the actual length of the glass fibers in the blend will depend to some extent upon the method of blending or mixing the components, as this may mechanically break down the length of the glass fibers.

The glass fibers to be used as reinforcements for plastic materials will customarily be provided by the manufacturer with a coating of a sizing material or a coupling agent, which terms are often used interchangeably. The nature of the sizing or coupling agent will influence the interfacial shear strength of the fiber and the polymer matrix, i.e., the degree to which the polymer and glass fiber will adhere. To contribute strength to a polymer blend, the interfacial shear strength will be at least comparably in magnitude to the shear strength of the polymer so that there will be good adhesion between the polymer and the glass fiber. The interfacial shear strength is influenced by the polarity of the polymer so that for some polymers certain sizings or coupling agents work better than others. For the case of blends containing polyketone polymers and ethylene-unsaturated acid copolymers, a variety of sizings are suitable, particularly sizing designed and provided particularly for use with polar polymers. Sizings are generally characterized by the general nature of the size rather than the specific chemical structures which are often proprietary to the glass fiber manufacturer. Suitable sizings include water emulsions of starch and lubricating oil, aqueous dispersions of surface active materials and lubricants, silicon-containing materials such a vinyl silanes, alkyltrimethoxysilanes, amino silanes and, trimethoxysilanes which may also contain urethane, acrylate or epoxy functionalities, and non-polar hydrocarbons. For use in the blends of the invention, sizings of the type having a trimethoxysilane group attached to a hydrocarbon chain with a terminal urethane functionality are preferred although sizings having a trimethoxysilane substituent on the end of a long hydrocarbyl group are also quite suitable. Such glass fibers are commercially available and are exemplified by OCF 492 Fiberglass which is available from Owens-Corning.

The glass fibers are employed in a quantity from about 1% by weight to about 40% by weight based on total reinforced blend but preferably in a quantity from about 5% by weight to about 25% by weight on the same basis.

The method of producing the reinforced blends of the invention is not critical so long as an intimate mixture of the three components is produced without undue degradation of the components or the resulting reinforced blend. In one modification the components are dry mixed and converted to a reinforced blend by application of elevated temperature and pressure. In an alternate modification, the components are passed through an extruder to produce the reinforced blend as an extrudate. The components are also usefully blended in a mixer which operates at elevated temperature at high shear.

The reinforced blends of the invention may also include other conventional additives such as antioxidants, stabilizers, fillers and reinforcements, mold release agents, fire retarding chemicals and other materials which are designed to improve the processability of the polymer or the properties of the resulting blend. Such additives are added together with, prior to or subsequent to the blending of the polymeric and glass fiber components.

The glass reinforced polyketone polymer/ethylene-unsaturated acid copolymer blends are uniform blends having properties improved over the components or non-reinforced blends of the same components. The reinforced blends exhibit improved modulus and strength and improved processability without the loss of other desirable properties in comparison to reinforced polyketone or non-reinforced blends. The reinforced blends are therefore particularly useful where molded parts are desired which require strength despite exposure to elevated temperatures. Illustrative of such applications are the production of both external and internal parts for automotive applications and structural parts of application in the construction industry.

A particular application arises in the automotive industry where molded parts must be stable to elevated temperature and mechanical impact but must also be capable of being painted to give painted surfaces characterized as a Class A finish. The blends of the invention offer sufficient processability to be molded, by injection molding for example, into shaped parts of sufficient mechanical strength to serve as an external part of an automobile. Moreover, the part is of sufficient stability and surface smoothness to enable painting of the part by procedures normally employed only for metal parts because of the severity of the painting and drying conditions. The resulting painted surface has been determined to at least approach a Class A surface, the surface required for painted external automobile parts. Few plastic materials designated for automotive use are painted and dried by the methods conventionally applied to metal objects and yet retain such a desirable finish.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced by contacting the monomers and a catalyst formed from palladium acetate, the anion of trifluoroacetic acid and 1,3-bis(diphenylphosphino)propane. The polymer had a melting point of 220° C. and a limiting viscosity number (LVN) of 1.75 measured at 60° C. in m-cresol.

ILLUSTRATIVE EMBODIMENT II

Blends of the polymer of Illustrative Embodiment I were prepared with an ethylene-acrylic acid copolymer (EAA) marketed under the name of PRIMACOR by Dow Chemical Company and mixtures of the polymer were prepared with OCF 492A glass fibers (GF) marketed by Owens-Corning Fiberglass. Blending or mixing was accomplished by passing the components through a Haake extruder at a temperature of about 255° C. and pressures of from about 500 psi to about 1000 psi to prepare pellets. The resulting pellets were injection molded to produce standard ASTM test bars from which physical properties could be measured. In one experiment, the flex modulus and flex strength of several blends were determined and compared with the properties of the polymers alone and two component mixtures of polymer and EAA and polymer and GF. The results are shown in Table I wherein all percentages are percents by weight based on total mixture.

TABLE I

| Polymer % | EAA, % | GF, % | Flex. Mod., psi | Flex. Str. psi | Notched Izod ft-lb/in. |
|---|---|---|---|---|---|
| 100 | — | — | 206,000 | 7,200 | 4.2 |
| 95 | 5 | — | 212,000 | 7,500 | 5.3 |
| 90 | 10 | — | 188,000 | 6,600 | 4.3 |
| 80 | 10 | 10* | 305,000 | 8,200 | 3.1 |
| 85 | 5 | 10** | 360,000 | 8,900 | 3.1 |
| 90 | — | 10** | 304,000 | 10,300 | 2.1 |

*non-polar hydrocarbon trimethoxysilane (Sizing A) sizing
**urethane modified trimethoxysilane (Sizing B) sizing

ILLUSTRATIVE EMBODIMENT III

Samples of several polymer blends or mixtures were prepared according to the general procedure of Illustrative Embodiment II. The samples were oven aged for one day, four days and seven days (the control) and withdrawn and tested. The tensile strength at yield and the elongation at break of the samples were determined at each testing. The results are shown in Tables II and III wherein all percentages are percents by weight based on total mixture.

TABLE II

| | | | Tensile Strength, psi | | |
|---|---|---|---|---|---|
| Polymer, % | EAA, % | GF, % | Control | 1 day | 4 day |
| 95 | 5 | — | 7,389 | 8,505 | 9,082 |
| 90 | — | 10 | 10,688 | 11,547 | 11,032 |
| 80 | 10 | 10* | 6,514 | 7,566 | 7,874 |

TABLE II-continued

| Polymer, % | EAA, % | GF, % | Tensile Strength, psi | | |
|---|---|---|---|---|---|
| | | | Control | 1 day | 4 day |
| 85 | 5 | 10** | 7,713 | 8,723 | 9,227 |

*Sizing A
**Sizing B

TABLE III

| Polymer, % | EAA, % | GF, % | Elongation to Break, in. | | |
|---|---|---|---|---|---|
| | | | Control | 1 day | 4 days |
| 95 | 5 | — | 49 ± 4 | 28 ± 4 | 21 ± 1 |
| 90 | — | 10 | 10 ± 1 | 10 ± 1 | 7 ± 2 |
| 80 | 10 | 10* | 51 ± 21 | 22 ± 2 | 15 ± 2 |
| 85 | 5 | 10** | 53 ± 6 | 27 ± 3 | 18 ± 1 |

*Sizing A
*Sizing B

ILLUSTRATIVE EMBODIMENT IV

The heat sag properties of several blends were measured by placing a test bar of the blend of dimensions approximately 7 in. by 11 in. by ⅛th in. in an oven on a support for one end of the bar. The temperature was raised for 30 minutes and the sag of the unsupported end of the bar was measured. A blend of the polymer of Illustrative Embodiment I with 5% EAA and 10% GF Sizing B) showed 0.1 in. heat sag at 325° F. and 0.2 in. heat sag at 375° F.

ILLUSTRATIVE EMBODIMENT V

Blends of the polymer of Illustrative Embodiment I with 5% EAA and 10% GF (Sizing B) were prepared in a Haake extruder and subsequently injection molded into discs at various temperatures. The molded discs were evaluated for Gardner impact resistance using a 2 pound weight. The results are shown in Table IV.

TABLE IV

| Mold Temperature | Gardner Impact Resistance, in. lb. |
|---|---|
| Cold (Room temperature) | 30 |
| Medium (100° F.) | 30 |
| 150° F. | 32 |

ILLUSTRATIVE EMBODIMENT VI

A linear alternating terpolymer of carbon monoxide, ethylene and propylene was produced by the procedure of Illustrative Embodiment I. The terpolymer had a melting point of 220° C. and LVN of 1.76. The terpolymer was extruded with 10% of OCF 492 and 5% PRIMACOR 1430 to prepare pellets.

The pellets were injection molded with a two cavity mold, each cavity of which was double gated. The molded part was a headlight bezzel for an automobile. The barrel temperature of the injection molder ranged from 480° F. to 518° F., the mold temperature was 150° F. and the cycle time was 35 sec. Upon trimming, the parts weighed about 290g each.

Priming of the bezzel was conducted under commercial conditions involving a rinse at 50°-140° F. with an aqueous phosphate solution, drying and application of a conductive primer. The primer was cured at an average temperature of 300° F. for 28 minutes and then heated at about 250° F. for 15 minutes. Subsequently, the bezzel was topcoated by electrostatic deposition at temperatures of about 390° F. to about 410° F. for approximately 30 minutes. The part was then baked at about 270° F. for an additional 30 minutes.

The parts survived the paint line with minimal sag and warpage and were satisfactory in adhesion and thermal shock tests. The painted parts are aesthetically pleasing.

What is claimed is:

1. A composition comprising a linear alternating polymer of carbon monoxide and at least one ethylenically unsaturated hydrocarbon of from 2 to 20 carbon atoms inclusive and a copolymer of ethylene and an α,β-ethylenically unsaturated carboxylic acid, said α,β-ethylenically unsaturated carboxylic acid having up to 10 carbon atoms, reinforced with alkali metal silicate glass fibers, wherein:
   (a) the linear alternating polymer of carbon monoxide and at least one ethylenically unsaturated hydrocarbon is present in an amount from about 45% by weight to about 98% by weight, based on total reinforced composition;
   (b) the copolymer of ethylene and an α,β-ethylenically unsaturated carboxylic acid is present in an amount from about 1% by weight to about 15% by weight based on total reinforced composition; and
   (c) the glass fibers are present in an amount from about 1% by weight to about 40% by weight, based on total reinforced composition.
2. The composition of claim 1 wherein the ethylenically unsaturated hydrocarbon is an α-olefin having from 2 to 10 carbon atoms.
3. The composition of claim 2 wherein the α-olefin is ethylene or propylene.
4. The composition of claim 3 wherein the alpha-olefin is ethylene.
5. A composition comprising:
   (a) from 45 to 98% by weight, based on the weight of the total
   composition, of a linear alternating polymer of carbon monoxide and
   at least one ethylenically unsaturated hydrocarbon of the formula

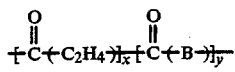

wherein B is the moiety of an ethlenically unsaturated alpha-olefin of at least 3 carbon atoms polymerized through the ethylenic unsaturated and the ratio of y:x is no more than 0.5;
   (b) from about 1 to about 15% by weight, based on the weight of the total composition, of a copolymer of ethylene and an α,β-ethylenically unsaturated carboxylic acid, said α,β-ethylenically unsaturated carboxylic acid having up to 10 carbon atoms;
   (c) from about 1 to about 40% by weight, based on the total composition, of alkali metal silicate glass fibers.
6. The composition of claim 5 wherein the alpha-olefin is propylene and the ratio of y:x is from about 0.01 to about 0.1.
7. The composition of claim 5 wherein y = 0.
8. The composition of claim 6 wherein the quantity of fibrous glass reinforcement is from about 5% by weight to about 25% by weight, based on total composition.

9. As an article of manufacture, a molded article produced from the composition of claim 5.

10. The article of claim 9 painted.

11. The composition of claim 1 wherein said glass fibers have diameters of about $2 \times 10^{-4}$ inches to about $8 \times 10^{-4}$ inches.

12. The composition of claim 11 wherein said glass fibers have lengths of about 0.1 inches to about 0.5 inches.

13. The composition of claim 1 wherein said glass fibers are coated with a sizing material.

14. The composition of claim 13 wherein said sizing material comprises a hydrocarbon having attached trimethoxysilane groups.

* * * * *